No. 845,087. PATENTED FEB. 26, 1907.
A. S. HOLCOMB.
POTATO PLANTER.
APPLICATION FILED OCT. 5, 1906.

3 SHEETS—SHEET 1.

Witnesses:
Christ Feinle
Harry D. Rapp

Adrian S. Holcomb, Inventor.
By Emil Keuhart, Attorney.

No. 845,087. PATENTED FEB. 26, 1907.
A. S. HOLCOMB.
POTATO PLANTER.
APPLICATION FILED OCT. 5, 1906.

3 SHEETS—SHEET 2.

Witnesses:
Christ Feinle
Harry D. Rapp

Adrian S. Holcomb, Inventor.
By Emil Keuhark
Attorney

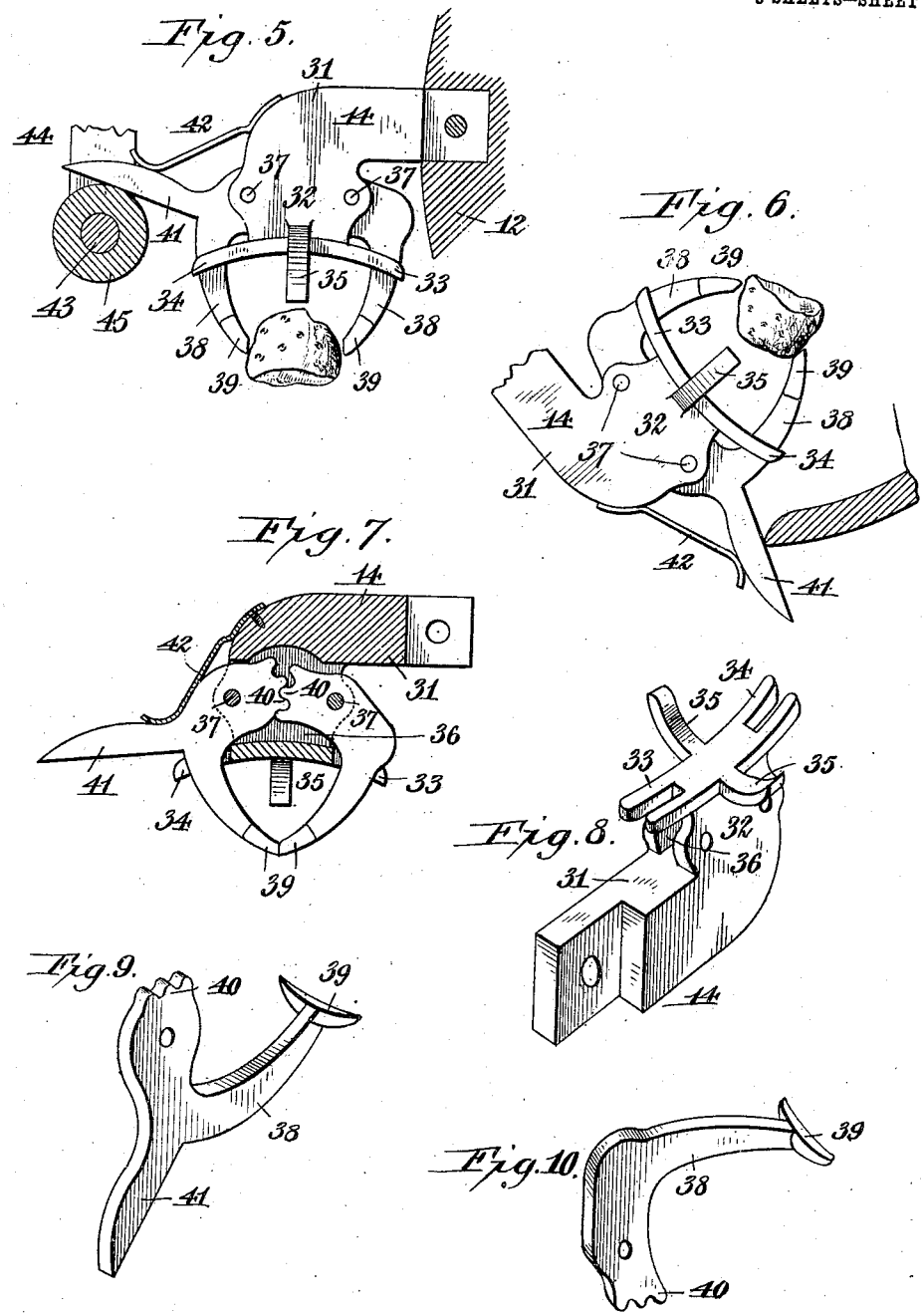

UNITED STATES PATENT OFFICE.

ADRIAN S. HOLCOMB, OF MARILLA, NEW YORK, ASSIGNOR TO SARAH C. HOLCOMB, OF MARILLA, NEW YORK.

POTATO-PLANTER.

No. 845,087.

Specification of Letters Patent.

Patented Feb. 26, 1907.

Application filed October 5, 1906. Serial No. 337,656.

*To all whom it may concern:*

Be it known that I, ADRIAN S. HOLCOMB, a citizen of the United States, residing at Marilla, in the county of Erie and State of New York, have invented certain new and useful Improvements in Potato-Planters, of which the following is a specification.

The object of my invention is the production of a simple, durable, and effective potato-planter with which a furrow is dug, the seed dropped automatically, and the furrow closed as the implement is being drawn over the ground.

The invention consists in the construction, arrangement, and combination of parts to be hereinafter described, and particularly pointed out in the appended claims.

Figure 1:
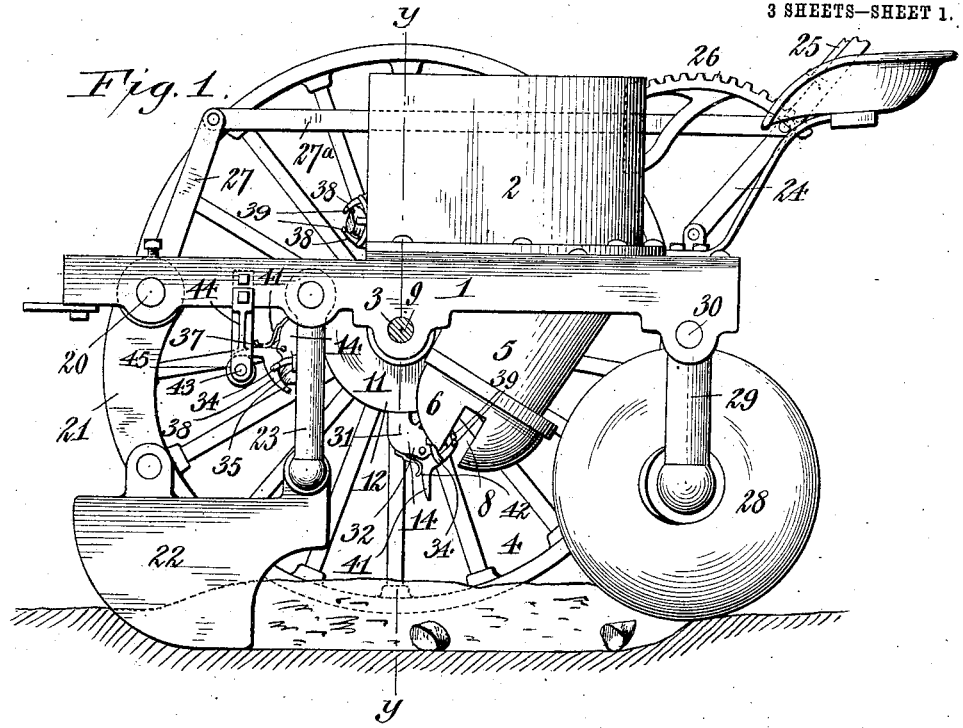
Figure 2:
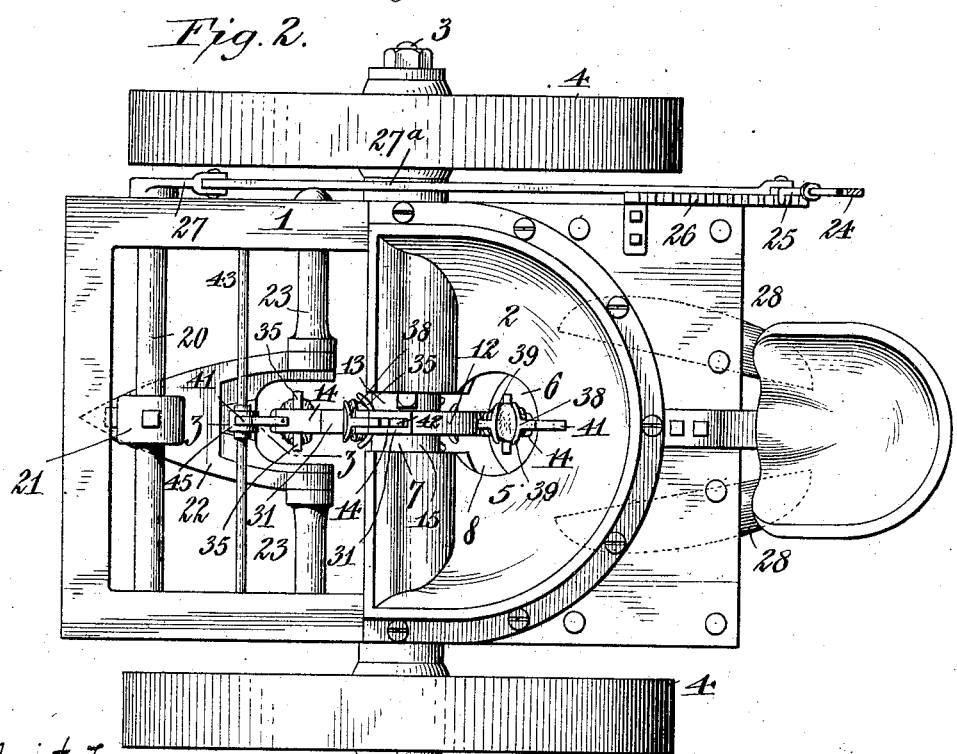
Figure 3:
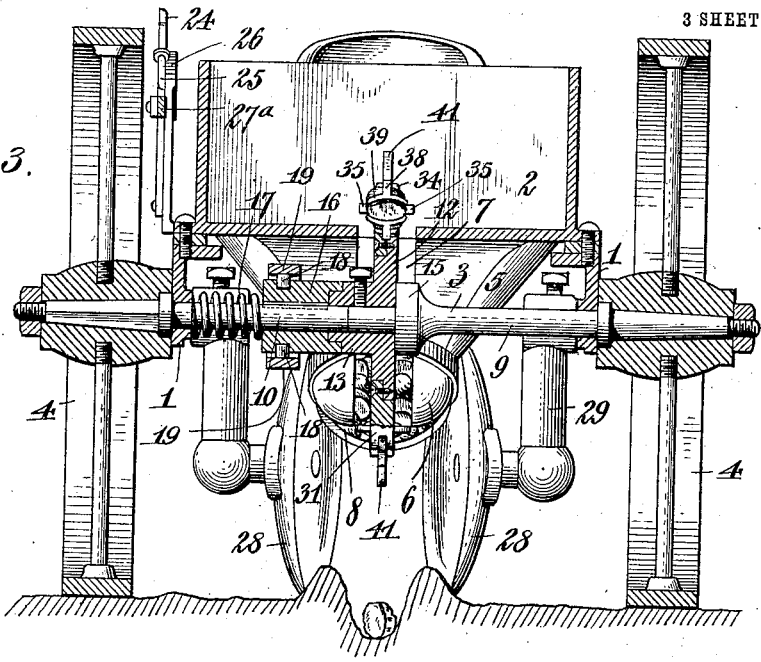
Figure 4:
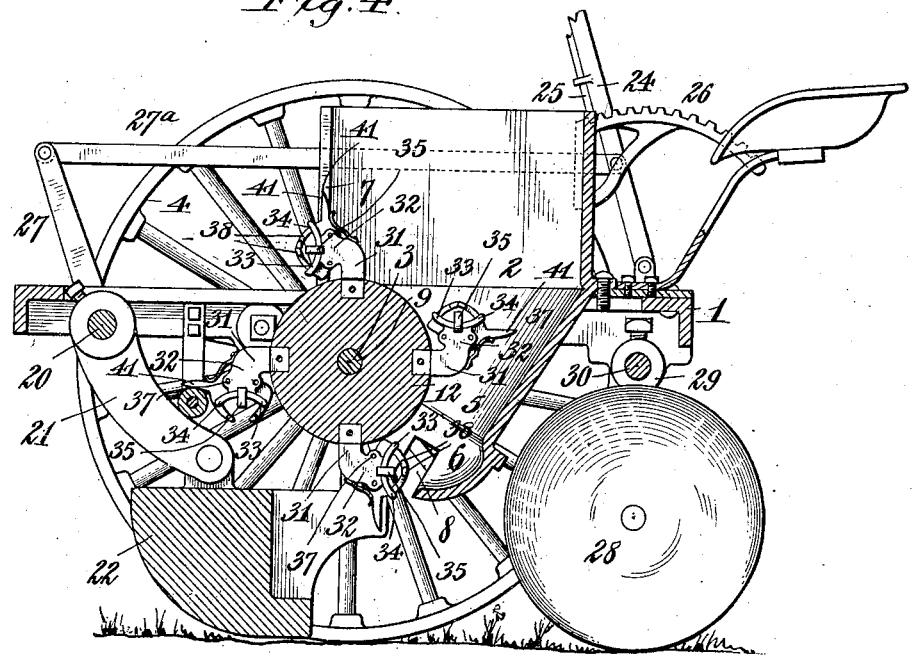

In the drawings, Figure 1 is a side elevation of my improved planter. Fig. 2 is a plan view of the same. Fig. 3 is a transverse section taken on line y y, Fig. 1. Fig. 4 is a central longitudinal section of the planter. Fig. 5 is an enlarged vertical longitudinal section taken on line z z, Fig. 2. Fig. 6 is an enlarged side elevation of one of the seed-droppers shown in the act of entering the bottom of the seed-receptacle, part of which latter is shown in section. Fig. 7 is an enlarged longitudinal section of one of the seed-droppers. Fig. 8 is an enlarged perspective view of the body portion of one of the seed-droppers. Fig. 9 is an enlarged perspective view of one of the grippers of the seed-droppers. Fig. 10 is an enlarged perspective view of one of the other grippers of the seed-droppers.

Referring to the drawings in detail, like numerals of reference refer to like parts in the several figures.

The reference-numeral 1 designates the body or frame of the implement, having a seed-receptacle attached thereto which extends above and below the frame. Mounted to revolve in said frame is a divided shaft or axle 3, to one part of which one of the traction-wheels 4 is secured, which serves to revolve said axle when the implement is drawn over the ground, while the other traction-wheel revolves on said axle.

The lower end of the seed-receptacle is tapered, as at 5, to form a hopper and terminates in a substantially semispherical portion 6, having its interior slightly enlarged beyond the adjacent portion of the hopper to prevent clogging of the seed. The front wall is provided with an opening 7, which extends from the top of the same to a point beyond the center of said semispherical portion and which is intersected at its lower end by a transverse slot 8 through said semispherical portion.

The shaft or axle 3 consists of two parts 9 and 10, and secured to the inner end of part 9 is a seed-dropper 11, comprising a disk 12, a hub 13, having a set-screw passing therethrough and impinging against said shaft, and a series of seed-grippers 14, arranged around the circumference of said disk. Part 9 of the shaft has a collar 15 formed thereon, against which the seed-dropper is held. Part 10 of said shaft enters the hub of the seed-dropper and is provided with a clutch member 16, splined to the same, so as to turn therewith while permitting of sliding movement toward and from the hub of the seed-dropper, said hub having clutch-teeth to be engaged by the teeth of said clutch member. Surrounding part 10 of the shaft between the frame of the machine and said clutch member is a coil-spring 17, which tends to retain said clutch member in engagement with the teeth on the hub of the seed-dropper. Said clutch member has a circumferential groove 7, into which fit studs 18, projecting inward from the forked end of an operating-lever 19.

Many other forms of clutches are now in use and are applicable for the purpose of connecting and disconnecting the two parts of the shaft, and any suitable and common means may be used to actuate the clutch. It is apparent that the purpose of the divided shaft and a clutch mechanism therefor is to cause the seed-dropper to be revolved when it is desired to plant potatoes and to disconnect the same from the driving part of the divided shaft to maintain it at rest.

A transverse rock-shaft 20 is located at the forward end of the frame, to which is secured a hanger 21, having pivotal connection at its lower end with a furrow-digger 22 near the front end thereof. Said furrow-digger is wedge-shaped and at its rear end is pivotally attached to two hangers 23, pivotally attached to the frame of the machine. As shown in Fig. 1, the furrow-digger is lowered to dig a furrow and direct the ground to each side of the furrow, while in Fig. 4 said digger is elevated to clear the surface of the ground, this being the position of the same when the machine is drawn to and from the field or when planting of the seed ceases. The furrow-digger is actuated by an operating-lever 24, having a spring-controlled latch 25, adapted to be moved over a toothed segment 26 for engagement therewith, a lever 27, connected to rock-shaft 20, and a rod 27ª, connecting lever 27 with the operating-lever. In this manner the extent of elevation or depression of the furrow-digger can be regulated to a nicety.

Suspended from the rear of the frame are furrow-closers in the form of disks 28, which are set at an angle to the longitudinal to return the ridges of earth formed along the furrow by the digger 22 into said furrow after the seed is dropped therein. Said disks are revolubly mounted in hangers 29, affixed to a rod 30, arranged transversely at the rear end of the machine.

Each of the seed-grippers comprises an arm 31, secured to disk 12 and terminating at its outer end in a substantially right-angular portion 32, extending in the direction of rotation of said disk. At the outer end of each of said arms inwardly and outwardly directed curved and slotted extensions 33 and 34, respectively, are formed, and extending from the arm mid-length of said extensions curved opposite lateral extensions 35 are formed. The latter pass into the hopper or seed-receptacle through the transverse slot 8, formed in the bottom thereof.

Each of the arms 31 are slotted longitudinally at 36, and secured to pivot-pins 37, passing through the slotted portion of each arm, are oppositely-directed gripping-fingers 38, which extend through the slots in the extensions 33 and 34 and are curved to contact at their outer ends, each of said gripping-fingers terminating in a curved gripping portion 39, arranged at a right angle to the finger proper. The inner ends of the gripping-fingers of each seed-gripper terminate beyond the pivot-pins 37 in segment-gears 40, which intermesh, the outer gripping-finger having an actuating-arm 41, which is adapted to engage certain fixed parts of the machine and cause the gripping-fingers to be opened and closed, as will presently appear. A spring 42 is secured to each of the arms 31 and bears with its free end against the edge of the outer gripping-finger of each pair of fingers, serving to retain the outer free ends of said fingers in contact to close the same.

Arranged transversely of the machine is a rod 43, secured in hangers 44, depending from the frame, and on said rod is a contact-roller 45, with which the actuating-arms 41 of the seed-grippers engage when the seed-dropper is revolved. Said actuating-arms also engage the lower end of the hopper when the gripping-fingers enter the same through the opening and slot formed in the bottom thereof.

Any suitable means may be provided to draw the machine over the ground, and when drawing the machine to and from the soil in which the seed is to be planted the clutch mechanism is disengaged and the furrow-digger elevated.

The operation of the machine is as follows: After the seed-receptacle is supplied with the seed to be planted and seeding is to be started the furrow-digger is lowered to cause a furrow to be dug and the clutch mechanism engaged to cause the seed-dropper to revolve on starting the machine forward. The seed-grippers successively enter the hopper through the opening in the bottom thereof, and when the actuating-arms successively come in contact with the hopper or seed-receptacle at the rear end of the opening 7 they cause the gripping-fingers 38 thereof to open and receive the seed, which is grasped by said fingers and carried upward and forward and then downward until said actuating-arms come in contact with the contact-roller, which action causes the gripping-fingers to be separated, so as to release the seed and permit the same to drop into the furrow. The disk closers then come into action to close the furrow, thus planting the seed in the soil.

Having thus described my invention, what I claim is—

1. In a potato-planter, the combination of a seed-receptacle having an opening in its lower end and in its front wall, a revoluble seed-dropper extending into said receptacle through said opening and comprising a body portion and seed-grippers provided with inwardly and outwardly directed curved extensions and pivoted coöperating gripping-fingers held normally in closed position, one of said gripping-fingers having an actuating-arm adapted to engage the seed-receptacle at the rear end of said opening to cause the gripping-fingers to open and take up the said seed in said receptacle, and a contact without the seed-receptacle to be engaged by said actuating-arm so as to cause the gripping-fingers to release the seed taken from said receptacle.

2. In a potato-planter, a seed-gripper comprising an arm having a slot at its outer end, gripping-fingers pivotally secured in said slot and having intermeshing gear-segments at their inner ends, and a spring acting to hold the outer ends of said gripping-fingers normally in contact.

3. In a potato-planter, a seed-gripper comprising an arm having a slot at its outer end and longitudinal and transverse extensions, a pair of gripping-fingers pivotally secured in said slot and connected to move in unison, one of said gripping-fingers having an actuating-arm, and a spring acting against one of said fingers to normally maintain the said fingers in closed position.

4. In a potato-planter, a seed-gripper comprising an arm having an angular end portion and a slot through said end portion and having longitudinal and transverse extensions, a pair of gripping-fingers pivotally secured in said slot and having their adjacent or inner ends provided with intermeshing gear-segments and their outer free ends in contact, one of said gripping-fingers having an actuating-arm, and a flat spring secured to said arm and bearing with its free end against one of said gripping-fingers and serving to maintain the outer free ends of said fingers in contact.

In testimony whereof I have affixed my signature in the presence of two subscribing witnesses.

ADRIAN S. HOLCOMB.

Witnesses:
L. C. LABER,
H. W. LABER.